(12) United States Patent
Yang et al.

(10) Patent No.: US 9,341,915 B2
(45) Date of Patent: May 17, 2016

(54) ELECTROPHORETIC DISPLAY FLUID

(71) Applicant: SIPIX IMAGING, INC., Fremont, CA (US)

(72) Inventors: Bo-Ru Yang, Banqiao (TW); Yao-Jen Hsieh, Zhubei (TW); Hong-Mei Zang, Fremont, CA (US); Hui Du, Milpitas, CA (US); T J Lin, Chadds Ford, PA (US); Roman Ivanov, Milpitas, CA (US); Haiyan Gu, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 264 days.

(21) Appl. No.: 13/736,815

(22) Filed: Jan. 8, 2013

(65) Prior Publication Data
US 2013/0175480 A1  Jul. 11, 2013

Related U.S. Application Data

(60) Provisional application No. 61/584,787, filed on Jan. 9, 2012.

(51) Int. Cl.
*H01B 1/00* (2006.01)
*G02F 1/167* (2006.01)

(52) U.S. Cl.
CPC ........ *G02F 1/167* (2013.01); *H01B 1/00* (2013.01); *G02F 2001/1678* (2013.01)

(58) Field of Classification Search
None
See application file for complete search history.

(56) References Cited

U.S. PATENT DOCUMENTS

| | | | |
|---|---|---|---|
| 3,766,125 A * | 10/1973 | Hansen et al. | 24/157 |
| 4,298,448 A | 11/1981 | Muller et al. | |
| 6,930,818 B1 | 8/2005 | Liang et al. | |
| 7,005,468 B2 | 2/2006 | Zang et al. | |
| 7,365,900 B2 | 4/2008 | Yamamoto | |
| 7,557,984 B2 | 7/2009 | Karasawa et al. | |
| 7,560,004 B2 | 7/2009 | Pereira et al. | |
| 7,933,062 B2 * | 4/2011 | Masuzawa et al. | 359/296 |
| 8,728,620 B2 | 5/2014 | Yanagisawa et al. | |
| 2004/0120024 A1 | 6/2004 | Chen et al. | |
| 2004/0219306 A1 | 11/2004 | Wang et al. | |
| 2008/0020007 A1 | 1/2008 | Zang | |
| 2008/0204855 A1* | 8/2008 | Yamamoto | 359/296 |
| 2008/0316578 A1* | 12/2008 | Karasawa et al. | 359/291 |
| 2011/0207036 A1 | 8/2011 | Jeon et al. | |
| 2013/0077155 A1 | 3/2013 | Wang et al. | |

FOREIGN PATENT DOCUMENTS

| | | |
|---|---|---|
| JP | 2006-292880 | 6/2006 |
| JP | 2008-152211 | 7/2008 |
| WO | WO 01//067170 | 9/2001 |

OTHER PUBLICATIONS

PCT/US2013/020681, PCT Notification of Transmittal of the International Search Report and the Written Opinion of the International Searching Authority, or the Declaration, mailed on Apr. 23, 2013.
Allen, K. (Oct. 2003). Electrophoretics Fulfilled. *Emerging Displays Review: Emerging Display Technologies, Monthly Report—Oct. 2003*, 9-14.
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814,I9.6.1.
Chen, S.M. (Jul. 2003) The Applications for the Revolutionary Electronic Paper Technology. *OPTO News & Letters*, 102, 37-41. (In Chinese, English abstract attached).
Chen, S.M. (May 2003) The New Application and the Dynamics of Companies. *TRI*. 1-10. (In Chinese, English abstract attached).
Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.
Ho, C., & Liang, R.C. (Dec. 2003). *Microcup® Electronic Paper by Roll-to-Roll Manufacturing Processes*. Presentation conducted at FEG, Nei-Li, Taiwan.
Ho, Candice. (Feb. 1, 2005) *Microcupt® Electronic Paper Device and Application*. Presentation conducted at USDC 4th Annual Flexible Display Conference 2005.
Hou, J., Chen, Y., Li, Y., Weng, X., Li, H., And Pereira, C. (May 2004). Reliability and Performance of Flexible Electrophoretic Displays by Roll-to-Roll Manufacturing Processes. *SID Digest*, 32.3, 1066-1069.
Lee, H., & Liang, R.C. (Jun. 2003) SiPix Microcup® Electronic Paper—An Introduction. *Advanced Display*. Issue 37. 4-9 (in Chinese. Enalish abstract attached).
Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.
Liang, R.C. (Apr. 2004). *Microcup Electronic Paper by Roll-to-Roll Manufacturing Process*. Presentation at the Flexible Displays & Electronics 2004 of Intertech, San Fransisco, California, USA.
Liang, R.C. (Oct. 2004) *Flexible and Roll-able Displays/Electronic Paper—A Technology Overview*. Paper presented at the METS 2004 Conference in Taipei, Taiwan.
Liang, R.C., & Tseng, S. (Feb. 2003). *Microcup® LCD, A New Type of Dispersed LCD By a Roll-to-Roll Manufacturing Process*. Paper presented at the IDMC, Taipei, Taiwan.

(Continued)

*Primary Examiner* — Mark Kopec
*Assistant Examiner* — Jaison Thomas
(74) *Attorney, Agent, or Firm* — Perkins Coie LLP

(57) ABSTRACT

The invention is directed to an electrophoretic fluid which can improve display performance such as switching speed, vertical bistability and the ghosting effect, and also reduce display defects. The electrophoretic fluid comprises charged pigment particles dispersed in a mixture of isoparaffins.

11 Claims, No Drawings

(56) References Cited

OTHER PUBLICATIONS

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (Feb. 2003) Microcup® Displays: Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) « , Format Flexible Microcup@ Electronic Paper by Roll-to-Roll Manufacturing Process » , Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices, p. 3*. (in Japanese, with English translation).

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Wang, X., Kiluk, S., Chang, C., & Liang, R.C. (Feb. 2004). Mirocup@ Electronic Paper and the Converting Processes. *ASID*, 10.1.2-26, 396-399, Nanjing, China.

Wang, X., Kiluk, S., Chang, C., & Liang, R.C., (Jun. 2004) Microcup@ Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, H.M. AND Li, P. (Jun. 2006) Roll-to-Roll Manufacturing Process for Full Color Electrophoretic film. *SID Digest*, 2006, pp. 1587-1589.

Zang, H.M, Hwang, J.J., Gu, H., Hou, J., Weng, X., Chen, Y., et al. (Jan. 2004). Threshold and Grayscale Stability of Microcup@ Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Zang, H.M., & Liang, R.C. (2003) Microcup Electronic Paper by Roll-to-Roll Manufacturing Processes. *The Spectrum*, 16(2), 16-21.

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

\* cited by examiner

ELECTROPHORETIC DISPLAY FLUID

This application claims priority to U.S. Provisional Application No. 61/584,787, filed Jan. 9, 2012; the content of which is incorporated herein by reference in its entirety.

FIELD OF THE INVENTION

The present invention is directed to an electrophoretic fluid which can improve display performance such as switching speed, bistability and the ghosting effect, and also reduce display visual defects.

BACKGROUND OF THE INVENTION

The electrophoretic display (EPD) is a non-emissive device based on the electrophoresis phenomenon of charged pigment particles dispersed in a solvent. The display typically comprises two plates with electrodes placed opposing each other. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

Alternatively, an electrophoretic fluid may comprise two types of charged pigment particles of contrasting colors and carrying opposite charges, and the two types of the charged pigment particles are dispersed in a clear solvent or solvent mixture. In this case, when a voltage difference is imposed between the two electrode plates, the two types of the charged pigment particles would move to opposite ends (top or bottom) in a display cell. Thus one of the colors of the two types of the charged pigment particles would be seen at the viewing side of the display cell.

For all types of electrophoretic display, the fluid contained within the individual display cells of the display is one of the most crucial parts of the device. The composition of the fluid determines, to a large extent, the performance of the device.

SUMMARY OF THE INVENTION

It has now been found that the performance of an electrophoretic display may be significantly improved if a mixture of at least two solvents selected from the group of isoparaffins is used as a dispersing solvent in the display fluid. The use of this type of solvent mixture has also been found to have an additional advantage, that is, the display cells may be better sealed, thus leading to a much lower number of visual defects.

One aspect of the present invention is directed to an electrophoretic fluid comprising charged pigment particles dispersed in a mixture of isoparaffins.

In one embodiment, the mixture of isoparaffins comprises isoparaffins having 8, 9 and 10 carbon atoms. In one embodiment, the mixture of isoparaffins comprises about 10% to about 30% of an isoparaffin having 8 carbon atoms. In one embodiment, the mixture of isoparaffins further comprises about 60% to about 80% of an isoparaffin having 9 carbon atoms. In one embodiment, the mixture of isoparaffins comprises a total percentage of an isoparaffin of 8 carbon atoms and an isoparaffin of 9 carbon atoms which is greater than about 90%.

In one embodiment, the mixture of isoparaffins comprises isoparaffins having 7, 8 and 9 carbon atoms. In one embodiment, the mixture of isoparaffins comprises about 10% to about 30% of an isoparaffin having 7 carbon atoms. In one embodiment, the mixture of isoparaffins further comprises about 30% to about 70% of an isoparaffin having 8 carbon atoms. In one embodiment, the mixture of isoparaffins further comprises about 10% to about 30% of an isoparaffin having 9 carbon atoms. In one embodiment, the mixture of isoparaffins comprises a total percentage of an isoparaffin of 7 carbon atoms, an isoparaffin of 8 carbon atoms and an isoparaffin of 9 carbon atoms which is greater than about 90%.

The fluid may comprise one or two types of charged pigment particles.

In another aspect of the present invention, the fluid further comprises uncharged or lightly charged neutral buoyancy particles.

DETAILED DESCRIPTION OF THE INVENTION

The present invention is directed to an electrophoretic fluid which comprises charged pigment particles dispersed in a mixture of isoparaffin solvents. For brevity, the isoparaffin mixture may be referred to as "the solvent mixture" throughout this application.

The term "isoparaffin" refers to a group of saturated hydrocarbons which are branched. Usually, the isoparaffins have from 5 to 20 carbons and they, when in liquid form, are clear and colorless. When the term "an isoparaffin" is used, it is understood that the term may also include its structural isomers.

The isoparaffin solvents are commercially available. For example, they are available under the trade name of Isopar® (by Exxon Mobil Chemical Company), Soltrol® (by Chevron Philips Chemical), Shellsol® (by Chevron Chemical), Isane® (by Total Petrochemicals) or Solane® (by Total Petrochemicals).

It is also noted that some of the solvent mixture may have a trace amount of aromatic species (i.e., less than 20 ppm) and/or an aniline point of between 55 to 70° C. These features may also be critical to improvement in performance of an electrophoretic fluid.

The isoparaffin having a low carbon number tends to evaporate easier than those having a high carbon number. Therefore, to avoid evaporation-induced performance problems, isoparaffins having a low carbon number should be avoided in the solvent mixture, if possible.

It is also noted that one or more of the isoparaffins in the solvent mixture may be replaced with one or more linear or cyclic hydrocarbons, as long as the linear or cyclic hydrocarbon is compatible with the isoparaffins in the mixture. Such a solvent mixture is also within the scope of the present invention.

The isoparaffins are mixed in various ratios in the solvent mixture, and the ratios are determined based on the desired viscosity of the resulting mixture, which preferably is in the range of about 0.8 to about 1.5 ($mm^2/s$ at 25° C.).

In one embodiment of the present invention, the solvent mixture contains predominantly isoparaffins having 7-12 carbon atoms and preferably 7-9 or 8-10 carbon atoms.

In one embodiment, the total weight percentage of various isoparaffins having less than 10 carbon atoms is at least about 75%, or at least about 80% or at least about 95%, in the solvent mixture.

In one embodiment, the total weight percentage of various isoparaffins having more than 10 carbon atoms is less than about 10% or less than about 5%, in the solvent mixture.

In one embodiment, it is preferred that the solvent mixture comprises predominantly isoparaffins having 8, 9 and 10 carbon atoms. In this embodiment, the total percentages of various isoparaffins having less than 8 carbon atoms and more than 10 carbon atoms is less than about 5%, or less than about 10% or less than about 20%. In a further embodiment, the solvent mixture comprises about 10% to about 30% of an isoparaffin having 8 carbon atoms. In a further embodiment, the solvent mixture further comprises about 60% to about 80% of an isoparaffin having 9 carbon atoms. In yet a further embodiment, the solvent mixture comprises a total percentage of an isoparaffin of 8 carbon atoms and an isoparaffin of 9 carbon atoms which is greater than about 90%.

In one embodiment, the solvent mixture may have less than about 10% by weight of an isoparaffin having more than 10 carbon atoms. In one embodiment, the solvent mixture may have less than about 5% by weight of an isoparaffin having more than 10 carbon atoms. In one embodiment, the solvent mixture may have less than about 1% by weight of an isoparaffin having more than 10 carbon atoms.

In one embodiment, the solvent mixture may have less than about 10% by weight of an isoparaffin having less than 8 carbon atoms. In one embodiment, the solvent mixture may have less than about 5% by weight of an isoparaffin having less than 8 carbon atoms. In one embodiment, the solvent mixture may have less than about 1% by weight of an isoparaffin having less than 8 carbon atoms.

In one embodiment, it is preferred that the solvent mixture comprises predominantly isoparaffins having 7, 8 and 9 carbon atoms. In this embodiment, the total percentages of various isoparaffins having less than 7 carbon atoms and more than 9 carbon atoms is less than about 5%, or less than about 10% or less than about 20%. In a further embodiment, the solvent mixture comprises about 10% to about 30% of an isoparaffin having 7 carbon atoms. In a further embodiment, the solvent mixture further comprises about 30% to about 70% of an isoparaffin having 8 carbon atoms. In a further embodiment, the solvent mixture further comprises about 10% to about 30% of an isoparaffin having 9 carbon atoms. In yet a further embodiment, the solvent mixture comprises a total percentage of an isoparaffin of 7 carbon atoms, an isoparaffin of 8 carbon atoms and an isoparaffin of 9 carbon atoms which is greater than 90%.

In one embodiment, the solvent mixture may have less than about 10% by weight of an isoparaffin having more than 9 carbon atoms. In one embodiment, the solvent mixture may have less than about 5% by weight of an isoparaffin having more than 9 carbon atoms. In one embodiment, the solvent mixture may have less than about 1% by weight of an isoparaffin having more than 9 carbon atoms.

In one embodiment, the solvent mixture may have less than about 10% by weight of an isoparaffin having less than 7 carbon atoms. In one embodiment, the solvent mixture may have less than about 5% by weight of an isoparaffin having less than 7 carbon atoms. In one embodiment, the solvent mixture may have less than about 1% by weight of an isoparaffin having less than 7 carbon atoms.

The term "about" in the present application refers to ±2% of the indicated value. Unless indicated otherwise, all percentages are % by weight.

The charged pigment particles dispersed in the solvent mixture, may be formed from an inorganic pigment, such as $TiO_2$, $ZrO_2$, ZnO, $Al_2O_3$, Cl pigment black 26 or 28 or the like (e.g., manganese ferrite black spinel or copper chromite black spinel). They also may be formed from an organic pigment with different colors, such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher.

Particle size is preferably in the range of about 0.01 to about 5 microns, more preferably in the range of about 0.05 to about 2 microns. The particles should have acceptable optical characteristics and should be chemically stable. The resulting fluid must also be stable against sedimentation, creaming or flocculation, under normal operating conditions.

The charged pigment particles may exhibit a native charge, or may be charged explicitly using a charge control agent or may acquire a charge when dispersed in the solvent mixture.

Suitable charge control agents are well known in the art; they may be polymeric or non-polymeric in nature and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex from International Specialty Products), (meth)acrylic acid copolymers or N,N-dimethylaminoethyl (meth)acrylate copolymers.

In one embodiment, the charge control agent is present in an electrophoretic fluid comprising charged pigment particles dispersed in a mixture of isoparaffins. In one embodiment, the fluid may have high particle loading (particle concentration) to suppress the evaporation rate, thus increasing the margin to add more solvent of higher volatility. In another embodiment, other additives (such as threshold agent or surfactant) may also be added to improve bistability, contrast ratio and structural integrity of a display device.

The electrophoretic fluid may be manufactured by any of the well-known methods including grinding, milling, attriting, microfluidizing and ultrasonic techniques. For example, the charged pigment particles in the form of a fine powder may be added to the solvent mixture and the resulting mixture is ball milled or attrited to break up the highly agglomerated dry pigment powder into primary particles.

Alternatively, the charged pigment particles may be pigment-containing microcapsules or microparticles which can be prepared chemically or physically. Typical microparticle forming/microencapsulation processes include interfacial polymerization, in-situ polymerization, phase separation, coacervation, electrostatic coating, spray drying, fluidized bed coating, solvent evaporation and the like.

In one embodiment of the present invention, the fluid may comprise only one type of the charged pigment particles dispersed in the solvent mixture of a contrasting color.

In another embodiment, the fluid may comprise at least two types of charged pigment particles dispersed in the solvent mixture. The two types of charged pigment particles may have different polarities, different zeta potentials, different mobilities and/or different colors.

The present electrophoretic fluid provides a number of advantages:

1. Improve Sealing Integrity

This feature is applicable to any types of electrophoretic display with partitioned space for electrophoretic fluid, including encapsulated electrophoretic fluid and/or fluids filled in the pre-partitioned display cells (e.g., microcups).

U.S. Pat. No. 6,930,818 discloses one type of electrophoretic display which comprises microcups as display cells. The content of U.S. Pat. No. 6,930,818 is incorporated herein by reference in its entirety.

Briefly, the microcups may be prepared by microembossing or photolithography. The microcups are then filled with the display fluid of the present invention, followed by sealing of the filled microcups.

The sealing may be accomplished in a number of ways. One approach is to disperse a sealing composition in the display fluid. The sealing composition may be immiscible with the display fluid and may have a specific gravity lower than that of the display fluid. The two compositions, the sealing compositing and the display fluid, are thoroughly mixed and then coated into the microcups. The sealing composition subsequently separates from the display fluid and floats to the top of the display fluid. A sealing layer is then formed by hardening the sealing composition in situ (i.e., when in contact with the display fluid).

Alternatively, the display fluid may be filled into the microcups first and a sealing composition is subsequently overcoated onto the filled microcups. A sealing layer, in this approach, is also formed in situ, by hardening the sealing composition. To reduce the degree of intermixing between the display fluid and the sealing composition, before hardening, it is preferred that the specific gravity of the sealing composition is lower than that of the liquid composition and the sealing composition and the display fluid are not miscible.

In general, the sealing composition may comprise a thermoplastic, thermoset or precursor thereof. Examples of such materials may include, but are not limited to, polyvalent acrylate or polyvalent methacrylate, polyvalent cyanoacrylate, polyvalent vinyl including vinylbenzene, vinylsilane, vinylether, polyvalent epoxide, polyvalent isocyanate, polyvalent allyl, oligomers or polymers containing crosslinkable functional groups or the like.

The sealing composition may also be aqueous-based. In this case, the sealing composition may comprise a water soluble polymer, with water as the sealing solvent. Examples of suitable water soluble polymers or polymer precursors may include, but are not limited to, cellulose polymers, latex, pseudolatexes, gelatin, polyvinyl alcohol, polyethylene glycol, PEG-PPG-PEG, PPG-PEG, PPG-PEG-PPG, polyvinyl pyrolidone, PVP/VA polysaccharides, starch, melamine-formaldehyde, phospholipids or the like.

The aqueous-based sealing composition may also comprise a water dispersible polymer with water as a formulating solvent. Examples of suitable water dispersible polymers may include, but are not limited to, water borne polyurethane, polyacrylate latex dispersions or the like.

It is also possible to use a silicone polymer or a fluorinated polymer, selected from polymers that consist of PDMS sub-units or polymers with perflurocarbon sub-units, polymers with perfluoroether sub-units or copolymers thereof. Monomers or oligomers of similar chemical nature may be present in the sealing composition for further curing of the composition. Suitable solvents may include solvents such as FC-43, halocarbon oil, a Galden fluid, a low molecular weight Krytox fluid or a PDMS containing solvent.

Other suitable sealing compositions are disclosed in U.S. Pat. No. 7,005,468, U.S. patent application Ser. No. 10/665,898 (Publication No. 2004-0120024A), Ser. No. 10/651,540 (Publication No. 2004-0112525A), Ser. No. 10/762,196 (Publication No. 2004-0219306A) and Ser. No. 11/774,773 (Publication No. 2008-0020007), the contents of all of which are incorporated herein by reference in their entirety.

It has been found that the electrophoretic fluid of the present invention may significantly improve the sealing integrity, especially when an aqueous-based sealing composition is used.

In an experiment, an electrophoretic fluid was prepared wherein a solvent mixture has a total percentage of isoparaffins having 8 and 9 carbon atoms which is greater than 90%. The electrophoretic fluid was then filled into microcups and sealed, according to U.S. Pat. No. 6,930,818. The sealing composition is an aqueous based sealing composition, as described in US Patent Application Publication No. US2008-0020007. The microcup film did not show any noticeable defects due to inadequate sealing, after storage under a temperature of 70° C. for 3 days.

2. Bistability

The electrophoretic fluid of the present invention comprising a solvent mixture selected from the group of isoparaffins may improve the bistability of the display device. This improvement is even more pronounced when uncharged or lightly charged neutral buoyancy particles are added into the fluid.

The term "lightly charged" is defined as having a charge which is less than 50%, preferably less than 25% and more preferably less than 10%, of the average charge carried by the positively charged pigment particles or negatively charged pigment particles.

The term "neutral buoyancy" refers to particles which do not rise or fall with gravity. In other words, the particles would float in the fluid between the two electrode plates. In one embodiment, the density of the neutral buoyancy particles may be the same as the density of the solvent mixture in which they are dispersed.

The uncharged or lightly charged neutral buoyancy particles may be formed from a polymeric material. The polymeric material may be a copolymer or a homopolymer. Examples of the polymeric material for the uncharged or lightly charged neutral buoyancy particles may include, but are not limited to, polyacrylate, polymethacrylate, polystyrene, polyaniline, polypyrrole, polyphenol, polysiloxane or the like. More specific examples of the polymeric material may include, but are not limited to, poly(pentabromophenyl methacrylate), poly(2-vinylnapthalene), poly(naphthyl methacrylate), poly(alpha-methystyrene), poly(N-benzyl methacrylamide) or poly(benzyl methacrylate). These materials are suitable for the neutral buoyancy particles in the one particle system or the two particle system.

More preferably, the uncharged or lightly charged neutral buoyancy particles are formed from a polymer which is not soluble in the solvent mixture in the display fluid, and also has a high refractive index. In one embodiment, the refractive index of the uncharged or lightly charged neutral buoyancy particles is different from that of the solvent mixture in which the particles are dispersed. However, typically the refractive index of the uncharged or lightly charged neutral buoyancy particles is higher than that of the solvent mixture. In some cases, the refractive index of the uncharged or lightly charged neutral buoyancy particles may be above 1.45.

The size of the uncharged or lightly charged neutral buoyancy particles is preferably in the range of about 100 nanometers to about 5 microns.

The concentration of the uncharged or lightly charged neutral buoyancy particles in an electrophoretic fluid is preferably more than 2.5% by weight, but not exceeding about 25% by weight.

Details of the uncharged or lightly charged neutral buoyancy particles are described in U.S. patent application Ser. No. 13/243,751, the content of which is incorporated herein by reference in its entirety.

3. Ghosting Phenomenon & Switching Speed

In order to update images in an electrophoretic display, waveforms are applied to move the charged pigment particles. However, if the refreshing time or refreshing energy is not sufficient, the previous image would remain and overlap with the new image. This effect is known as "ghosting". To avoid ghosting, the usual approach is to increase the refreshing time or driving voltage.

Now it has been found by the present inventors that while a mixture of isoparaffins is used in an electrophoretic fluid to disperse the charged pigment particles, the ghosting phenomenon may be significantly reduced.

In an experiment, an electrophoretic fluid was prepared using a solvent mixture having a total percentage of isoparaffins having 8 and 9 carbon atoms which greater than 90%. The electrophoretic fluid was filled into microcups and sealed, according to U.S. Pat. No. 6,930,818.

The experiment was run using a waveform with a total updating time of 380 msec. The results are as follows:

| | |
|---|---|
| white-ghosting | 0.73 L* |
| black-ghosting | 1.03 L* |

CIE L*a*b* (CIELAB) is the most complete color model used conventionally to describe all the colors visible to the human eye. The L* value which represents the luminance of a color ranges between 0 (black) and 100 (white). It is commonly recognized in the display field that a value of less than 2 L* indicates a good performance in terms of ghosting. The waveform length of 380 msec also confirms a high switching speed.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic fluid comprising charged pigment particles dispersed in a mixture of isoparaffins, wherein the mixture comprises isoparaffins having 8, 9 and 10 carbon atoms, and the total percentage of isoparaffins having less than 8 carbon atoms and isoparaffins having more than 10 carbon atoms is greater than 0% and less than 20% of the mixture.

2. The fluid of claim 1, wherein the total percentage of the isoparaffins having less than 8 carbon atoms and the isoparaffins having more than 10 carbon atoms is less than 10%.

3. The fluid of claim 1, wherein the total percentage of the isoparaffins having less than 8 carbon atoms and the isoparaffins having more than 10 carbon atoms is less than 5%.

4. The fluid of claim 1, wherein the mixture of isoparaffins further comprises a trace amount of aromatic species.

5. The fluid of claim 1, wherein the mixture of isoparaffins further comprises one or more linear or cyclic hydrocarbons.

6. The fluid of claim 1, further comprising a charge control agent.

7. The fluid of claim 1, comprising one type of charged pigment particles.

8. The fluid of claim 1, comprising two types of charged pigment particles of contrasting colors and carrying opposite charge polarities.

9. The fluid of claim 1, further comprising uncharged or lightly charged neutral buoyancy particles.

10. The fluid of claim 9, wherein the uncharged or lightly charged neutral buoyancy particles are formed from a material selected from the group consisting of polyacrylate, polymethacrylate, polystyrene, polyaniline, polypyrrole, polyphenol, and polysiloxane.

11. The fluid of claim 9, wherein the uncharged or lightly charged neutral buoyancy particles are formed from a material selected from the group consisting of poly(pentabromophenyl methacrylate), poly(2-vinylnapthalene), poly(naphthyl methacrylate), poly(alpha-methystyrene), poly(N-benzyl methacrylamide), and poly(benzyl methacrylate).

* * * * *